(12) United States Patent
Strom et al.

(10) Patent No.: US 9,353,734 B2
(45) Date of Patent: May 31, 2016

(54) ACTIVE MATERIAL ELEMENTS HAVING REINFORCED STRUCTURAL CONNECTORS

(71) Applicant: GM GLOBAL TECHNOLOGY OPERATIONS LLC, Detroit, MI (US)

(72) Inventors: Kenneth A. Strom, Washington, MI (US); Nancy L. Johnson, Northville, MI (US); Nilesh D. Mankame, Ann Arbor, MI (US); Jason R. Spenny, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 450 days.

(21) Appl. No.: 13/834,709

(22) Filed: Mar. 15, 2013

(65) Prior Publication Data

US 2013/0199172 A1    Aug. 8, 2013

Related U.S. Application Data (63) Continuation-in-part of application No. 12/250,148, filed on Oct. 13, 2008, now abandoned.

(51) Int. Cl.
| | |
|---|---|
| *H01R 9/00* | (2006.01) |
| *F03G 7/06* | (2006.01) |
| *B23P 11/00* | (2006.01) |
| *F16G 11/02* | (2006.01) |

(52) U.S. Cl.
CPC ............ *F03G 7/065* (2013.01); *B23P 11/005* (2013.01); *F16G 11/02* (2013.01); *Y10T 29/49908* (2015.01)

(58) Field of Classification Search
CPC ............ H01R 9/00; H01R 11/12; H01R 9/05; H01R 43/20
See application file for complete search history.

(56) References Cited

U.S. PATENT DOCUMENTS

| | | | | | |
|---|---|---|---|---|---|
| 2,747,171 | A | * | 5/1956 | Martines ................ | H01R 4/183 439/877 |
| 3,771,111 | A | * | 11/1973 | Pritulsky .............. | H01R 43/058 439/850 |
| 4,294,006 | A | * | 10/1981 | Bair ...................... | G05B 19/108 29/596 |
| 4,544,988 | A | * | 10/1985 | Hochstein .......... | H01H 61/0107 337/140 |
| 6,016,096 | A | * | 1/2000 | Barnes ................ | H01H 61/0107 337/12 |
| 6,086,433 | A | * | 7/2000 | Hils ........................ | H01R 4/185 439/849 |
| 6,997,746 | B2 | * | 2/2006 | Taylor .................. | H01R 13/115 439/585 |
| 7,256,518 | B2 | * | 8/2007 | Gummin ................ | F03G 7/065 310/12.33 |
| 7,491,101 | B2 | * | 2/2009 | Irish ........................ | H01R 11/22 439/853 |
| 7,650,914 | B2 | * | 1/2010 | Bogursky ............... | H01R 4/188 140/105 |
| 7,685,859 | B2 | * | 3/2010 | Ukpai .................... | B21D 17/02 72/414 |
| 7,765,689 | B2 | * | 8/2010 | Irish ........................ | H01R 11/22 29/564.1 |
| 7,972,718 | B2 | * | 7/2011 | Bailey .................. | H01M 2/0202 251/11 |

(Continued)

*Primary Examiner* — Jorge Pereiro
*Assistant Examiner* — Shafiq Mian
(74) *Attorney, Agent, or Firm* — Reising Ethington P.C.

(57) ABSTRACT

A load-carrying active material assembly and a method of preparing such an active material assembly suitable for attachment to a movable component of a mechanism is described. The assembly includes a shape memory alloy (SMA) element, a connector adapted to engage the moveable component mechanically crimped to the SMA element, and a filler material disposed intermediate the connector and SMA element. The filler may be a solder or a polymer. Methods for appropriately distributing the filler material and for promoting good adhesion of the filler to the SMA element and the connector are described.

20 Claims, 4 Drawing Sheets

(56) References Cited

U.S. PATENT DOCUMENTS

| | | | | |
|---|---|---|---|---|
| 2008/0202637 A1* | 8/2008 | Hector | C09K 13/04 | 148/280 |
| 2010/0092238 A1* | 4/2010 | Zavattieri | F16G 11/02 | 403/274 |
| 2011/0136397 A1* | 6/2011 | Koga | H01R 4/185 | 439/877 |
| 2012/0094143 A1* | 4/2012 | Zhang | A61L 27/06 | 428/615 |
| 2012/0324727 A1* | 12/2012 | Seifert | H01R 4/187 | 29/867 |

* cited by examiner

ACTIVE MATERIAL ELEMENTS HAVING REINFORCED STRUCTURAL CONNECTORS

RELATED APPLICATIONS

This patent application is a continuation-in-part of co-pending U.S. patent application Ser. No. 12/250,148, entitled "ACTIVE MATERIAL ELEMENTS HAVING REINFORCED STRUCTURAL CONNECTORS" filed on Oct. 13, 2008, the disclosure of which being incorporated by reference herein.

TECHNICAL FIELD

This invention pertains to connectors and methods of joining connectors to shape memory alloy elements to form a connector assembly intended to transmit forces in a mechanical device.

BACKGROUND

Active material elements may provide the mechanical impetus to operate mechanisms of various kinds. One suitable family of such active material elements is Shape Memory Alloys. Linear mechanical actuators incorporating active elements of shape memory alloy (SMA) compositions have been used in a variety of devices, many of which have been conceived for use on automotive vehicles. For example, U.S. Pat. Nos. 7,607,717, 7,686,382, and 8,188,757, and Patent Application Publications 2012/0174573 and 2012/0184195, each assigned to the assignee of this invention, describe and illustrate a number of on-vehicle devices using linear mechanical actuators formed of shape memory alloys such as nickel-titanium based alloys. The portions of these patent disclosures pertaining to compositions, shapes, and functions of shape memory alloy, mechanical actuators for devices are incorporated herein by reference. These documents describe and illustrate that movable air flow dams, air flow spoilers, and baffle controllers within Heating Ventilation Air Conditioning (HVAC) outlet housings are examples of on-vehicle devices that may be set in motion by linear SMA actuators.

These SMA elements undergo a transformation of their crystal structure over a narrow and selectable temperature range. In transforming from the lower temperature phase to the higher temperature phase the SMA element, or other similar elongated form, seeks to contract. If such contraction is opposed, the SMA element will seek to overcome the opposition and in so doing generate appreciable force. This force which, when harnessed and transmitted, may power and operate the above-listed mechanisms and devices, among others.

It will be appreciated that the force generated must be coupled to the mechanism. Generally this is accomplished by first coupling the SMA element to a connector shaped and adapted to couple to the mechanism, and then suitably attaching the connector, with its attached linear SMA element, to the mechanism. Thus a robust and reliable joint must be made between the SMA element and its associated connector.

SUMMARY OF THE INVENTION

The present invention relates to plural embodiments of methods of forming a robust mechanical and, optionally, electrical connection between a mechanism or a structural member and an active material element, particularly a linear, elongated shape memory alloy (SMA) element such as a wire, tape, braid, cable or the like. Exemplary mechanisms may include air dams, louvers, latches and the like.

The invention employs a shaped unitary connector, often fabricated of thin sheet. The connector may comprise a retaining portion which has been suitably shaped to create an SMA element-receiving cavity or receptacle. In some embodiments, the element-receiving cavity or receptacle has the form of a hollow cylinder, open at its ends, so that the element may be inserted into the interior cylinder volume. In other embodiments the SMA element-receiving cavity may be in the form of a trough sized to receive the SMA element. The trough may be open on one side and at its ends but with walls or wings which may first be bent or folded over the element to create a tubiform body. The inner wall of the tubiform body may then define a suitable cavity for containing the SMA element.

The receiving portion thus comprises an open or closed cavity bounded by a thin, deformable, sheet metal shell or casing. The length of the casing may be selected so that an SMA element inserted from end to end in the cavity, may, after suitable processing as described below, resist longitudinal loads which arise in operation of the SMA element and seek to pull the elements from the connector. After an end portion of the SMA element is fully inserted into the cavity, the sheet metal casing may be deformed and collapsed inwardly to diminish the cavity volume and bring the inner surface of the casing which defines the cavity volume, into engagement with the SMA element. Such inward collapse may be achieved by crimping, a process in which a tool with opposed, complementary dies adapted to generate an inwardly-directed compressive force, applies pressure to the outer surface of the casing. It will be appreciated that the outer, tool-contacting, surface of the casing is coextensive with and opposed to the inner, SMA element-contacting casing surface. Crimping thus serves to compact and re-shape the casing so that at least some of the inner cavity wall of the casing, contacts and engages the element. The element-contacting cavity walls may comprise ridges, protrusions or similar features to enhance element-cavity engagement. The cavity wall-element engagement imposes a frictional resistance to oppose relative motion between the SMA element and the connector and, possible removal of the SMA element from the cavity when a load is applied along the length axis of the element.

In both the open and closed casing embodiments the crimp tool may apply force along substantially only along one direction to collapse and flatten the element-retaining casing or it may apply force generally around the periphery of the casing to more or less uniformly radially collapse the casing. It will be appreciated that although, in the open casing embodiment, the deformation sequence may involve two successive operations, bending or folding of the walls/wings to form a tubiform body followed by collapse of the tubiform body, these operations may be carried out in a single step using a single tool with appropriately-designed tool surfaces. Further, in all embodiments, the tool surfaces may extend longitudinally along substantially the length of the connector retaining portion.

The crimp tool surfaces extending the length of the retaining portion may be planar or non-planar. Non-planar geometries, especially those which impart a wave-like or generally sinusoidal shape with one or more alternating peaks and valleys to the retaining portion cross-section may be especially effective in opposing element removal. In such cross sections the cavity walls may be collapsed at only the peaks and the valleys, but removal of the SMA element requires that it bend and re-bend at each peak and valley. The additional bending work required for the element to progress through the peaks and valleys of the retaining portion is additive to the frictional restraint and provides additional impediment to element pull-out.

Crimping will typically leave gaps, voids or spaces between the element and the element-engaging surfaces of the connector portion casing. Such voids will limit the surface area of the SMA element which engages with the connector portion casing wall and so reduce the load-carrying ability of the SMA-connector joint. To enhance the SMA-connector joint strength, a filler material may be introduced into the voids. The filler material may be selected to cooperatively interact with the crimped connector to enhance the element connector interaction and render desired structural characteristics to the element-connector portion joint. In some embodiments the filler may also contribute to the electrical characteristics of the joint, for example by enhancing electrical conductivity. Generally the filler is selected to wet the casing wall and the SMA, and, preferably to bond to both the casing wall and the SMA wire. This may require that the element surface or the casing wall, or both, be subject to surface treatments to enhance the wetting action of the filler and promote superior adhesion of the filler to the wall and SMA. This is particularly anticipated if the SMA element composition is the commonly-used Nitinol alloy, a near-equiatomic alloy of nickel and titanium which readily develops an adherent, difficult-to-wet oxide layer. Suitable surface treatments may include chemical and electrochemical treatments, including oxide removal processes or plating. Energy beam treatments such as, for example, laser or electron beam treatments, may also be used as may plasma treatments and mechanical treatments such as abrasion or sandblasting.

Exemplary filler materials may include polymers, both thermosets and thermoplastics, and electrically-conductive low melting point alloys or solders. Polymer fillers may contain chopped or powdered additives to create polymer composite fillers which improve the electrical conductivity and/or the strength of the polymer. Some candidate polymer filler materials such as chopped carbon fibers or nanotubes may serve to enhance both the electrical and structural characteristics of the joint.

The filler material may be introduced into the crimped joint in several ways. The filler material may be placed or deposited in the element-receiving cavity or on the SMA element prior to its insertion into the element-receiving cavity. The filler material may then be displaced and distributed by the pressure applied during crimping. In the case of unmixed two-part polymer compositions it may be desired to place the first part on one of the connector and element and the second part on the other of the connector and element. In these embodiments the joint may be crimped while the filler is in either a solid or a liquid state. A solid filler may be suitable provided it may flow extensively under pressure at about ambient temperature, that is, about 25° C. or so, to fill at least the majority of the cavities. If the filler is solid, or has unacceptably high viscosity at ambient temperature, the joint may be heated to render a liquid or lower viscosity state of the filler to render it more flowable and capable of filling the cavities. In an alternative embodiment, the filler, in a flowable state, may be infiltrated into the crimped joint, after crimping, through capillary action. While the filler is in a flowable state the joint may be crimped again to further redistribute the filler and enhance joint strength.

Mechanisms which may suitably be actuated by SMA elements may, in some embodiments, employ a plurality of SMA elements. Practices of the invention are suitable for applications where a plurality of SMA elements may be employed and secured at a common connector. The arrangement of the plurality of elements is not pertinent to the utility of the invention. The plurality of elements may be arranged as separate elements such as wires, or loosely grouped elements, or interleaved elements in the form of a woven braid, or gathered together and twisted elements in the form of a rope or cable.

Other aspects and advantages of the present invention will be apparent from the following detailed description of the preferred embodiment(s) and the accompanying drawing Figures.

BRIEF DESCRIPTION OF THE DRAWINGS

A preferred embodiment(s) of the invention is described in detail below with reference to the attached drawing Figures, wherein:

FIGS. 3A-D show, in perspective view, several embodiments of connectors prior to and subsequent to crimping.

DETAILED DESCRIPTION

The following description of the preferred embodiments is merely exemplary in nature and is not intended to limit the invention, its application, or uses.

Elongated linear shape memory alloy (SMA) elements, such as wires, tape, braids and the like, are often used to transfer tensile loads between, or cause displacements of, structural members such as may be components of a mechanism like an air dam or HVAC vent. Exemplary views of such devices and their associated SMA elements are shown in some detail at U.S. Pat. No. 7,607,717 (FIGS. 2, 3) and U.S. Pat. No. 7,686,382 (FIGS. 2, 3), each of which shows an operating mechanism for an air dam, and U.S. Patent Application Publication 2012/0184,195 (FIGS. 3, 4) which shows an operating mechanism for an air vent. Such SMA elements exhibit a temperature-induced phase change or forward transformation from a lower temperature martensite form to a higher temperature austenite form on heating and a reverse transformation from austenite to martensite on cooling. During the martensite to austenite phase change, the forward transformation, the SMA element will shorten by up to about 7%. If any resistance to such shortening is experienced, as, for example, in an element stretched between two fixed bodies, a force is generated. Thus an SMA element in its martensite phase and secured to one or more moveable bodies at its ends may, on transforming to austenite, seek to displace the movable body or bodies, applying sufficient force to overcome any resistance due to gravity, friction, stiction or the like. Alternately, if the ends are attached to immovable bodies, tension will develop in the SMA element and be transferred to the bodies.

The transformation may be reversed by cooling the element in its austenite phase to a sufficiently low temperature to cause it to transform to its martensite phase. The reverse transformation substantially undoes the effects of the forward transformation save for the change in the length of the element. But, the now-martensite element may now be restored to its original configuration by stretching it by about 7%, that is, sufficient to extend the shrunken element to its initial length. This stretch may be imparted by, for example, a spring or deadweight, and serves to reset the element, and the mechanism to which it is attached, to its original state so that the complete sequence of events may be repeated. This cycle of heating, cooling and stretching may be repeated many times, possibly over tens or hundreds of thousands of cycles, enabling the SMA element to operate an SMA (powered) actuator.

Such SMA actuators find numerous applications in vehicles where, as noted above, they may be employed to repeatedly extend and retract a vehicle air dam or to repeatedly open and close vanes on cooling vents, among many other examples. In other applications, such as many aerospace applications, an SMA actuator may be intended for only a one-time use such as unlatching a connector or deploying an antenna or an airfoil. But, irrespective of the intended number of operating cycles of the SMA device it is essential that the SMA element-generated force be reliably conveyed to the device operated by the actuator.

Figure 1:
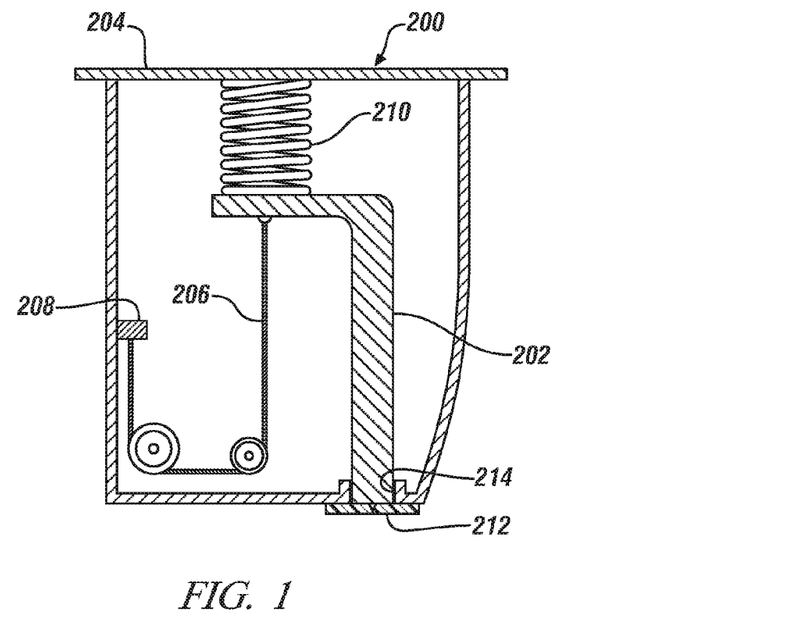
FIGS. 1 and 2 show a simplified representation of an SMA element-operated air dam in its stored (FIG. 1) and deployed (FIG. 2) configurations.
Figure 2:
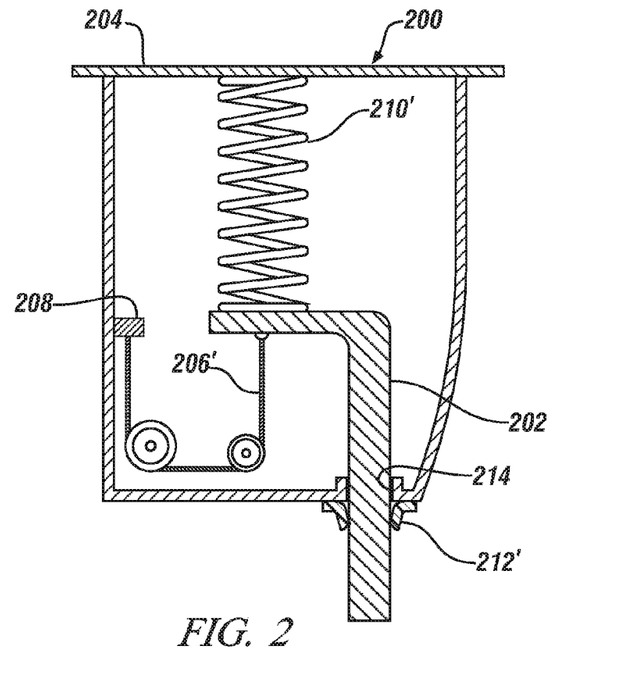

FIGS. 1 and 2 show a simplified representation of an SMA-actuated retractable air dam to more clearly illustrate the loads applied to an SMA element during operation. FIG. 1 shows an air dam assembly 200 with air dam 202, in its retracted position, contained within housing 204. Linear SMA element 206 routed in the form of a 'U' for compactness is secured at one end to mounting block 208, attached to housing 204 and at its second end to air dam 202. Here SMA element 206 is in its deformable martensite state and is extended by bias spring 210, withdrawing air dam 202 into housing 204 guided by slot 214 and enabling flexible seals 212 to close off slot 214. FIG. 2 illustrates the air dam 202 in its deployed configuration. On heating SMA element 206, for example by Joule heating (not shown), the SMA element 206' will transform to austenite, shrink, and extend the air dam through slot 214, displacing flexible seals 212' and extending bias spring 210' as it does so. This force, and the inverse force generated by spring 210/210' as element 206' cools and undergoes reverse transformation to martensite element 206 during subsequent storage of the air dam must be sustained at the attachment points of element 206/206' with air dam 202 and mounting block 208.

In many applications an SMA element is not attached directly to a structural member. Rather, the element is attached to a connector suitably shaped for attachment to the structure. Commonly the connector is shaped for positive mechanical engagement with a complementarily-shaped feature attached to the structure or mechanism. Suitable combinations may include, for example, a hook and an eye or a clasp and buckle or similar so that enabling a robust connection between the SMA element and the structure first requires making a robust connection between the SMA element and the connector. Hence, the method of joining the SMA element end to the connector must promote an element-connector joint capable of transmitting at least the maximum force generated by the SMA as it undergoes its phase transition.

In many applications the SMA element is externally heated. One commonly-used heating technique is to pass a controlled electric current along the length of the SMA element so that resistive or Joule heating elevates the element temperature and promotes the martensite to austenite transformation. It may therefore be convenient or desirable to enable both a robust mechanical connection and a robust electrical connection between the SMA element and the connector.

Among conventional methods of joining SMA elements to connectors, mechanical crimping is the most widely used. Crimping is a process in which a workpiece, here an end of an SMA element, is inserted into a thin metal casing, generally cylindrical or a cylindrical segment. Then the casing is compressed using suitable opposing complementarily-shaped tools, to form a tight-fitting sleeve around the element. Flat face tools will apply the force to only a portion of the casing and will generally ovalize and then flatten an initially round, cylindrical casing. Other shaped tools, usually concave in cross-section, may apply a more uniform inwardly-directed radial force which is more effective in maintaining the casing cross-section and shrinking it more or less uniformly around SMA element. By this process the element is secured to the casing through frictional engagement between the element and the close-fitting metal casing compressed about the element. This frictional engagement will oppose relative motion of the element and casing under an axial load such as is developed during forward transformation of the SMA element.

Thus a suitable connector will include a feature suitable for engagement with a complementarily shaped feature which may be attached to a mechanism and/or a structure and a retaining portion, a crimpable feature which serves to secure the SMA element to the connector.

The nature of the crimp joint will depend on the initial shape of the casing, the nature of the crimp tool faces and, possibly, the skill of the operator for manual crimps or the machine settings for machine-made crimps. In general however, the crimped casing does not engage the SMA element completely around the element perimeter or completely along its length. Gaps or voids will be present where the crimping process did not lead to full engagement of the element-contacting casing wall and the element surface. Thus full frictional restraint is not achieved and the forces developed during forward, martensite to austenite, transformation may be sufficient to cause the element to slip, partially or completely, out of the crimped casing thereby reducing actuator effectiveness. As described more fully below, the casing-SMA element frictional restraint may be enhanced by introduction of a filler into the voids generated during the crimping process.

Figure 3A:
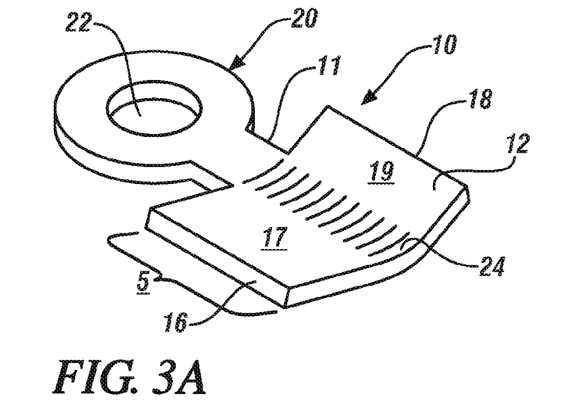
FIG. 3A shows a connector, prior to crimping, with an eye attachment and two inclined walls defining a trough for receiving an SMA element.
Figure 3B:
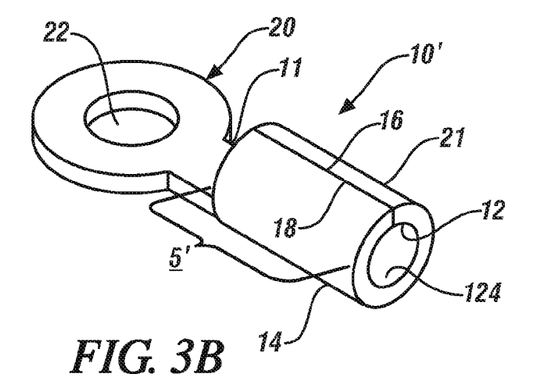
FIG. 3B shows a similar eye attachment connector with a hollow cylindrical receptor for the SM element.
Figure 3C:
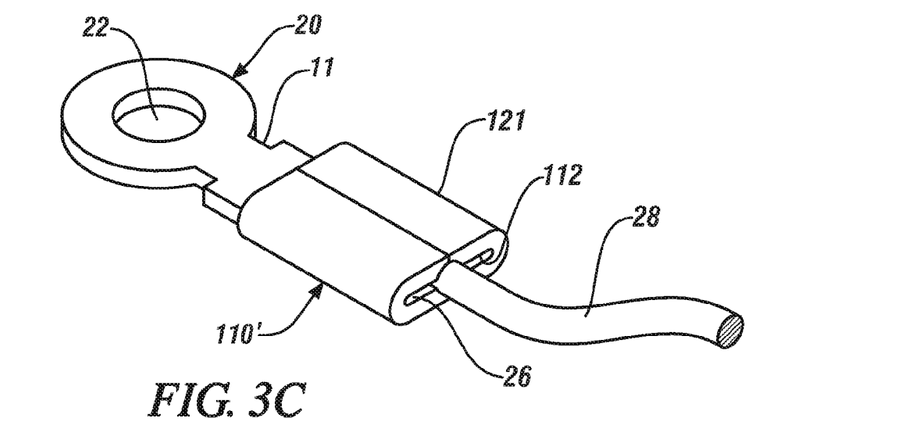
FIG. 3C shows the connector of FIG. 3B and a representative SMA element after crimping using a flat-faced crimp tool.
Figure 3D:
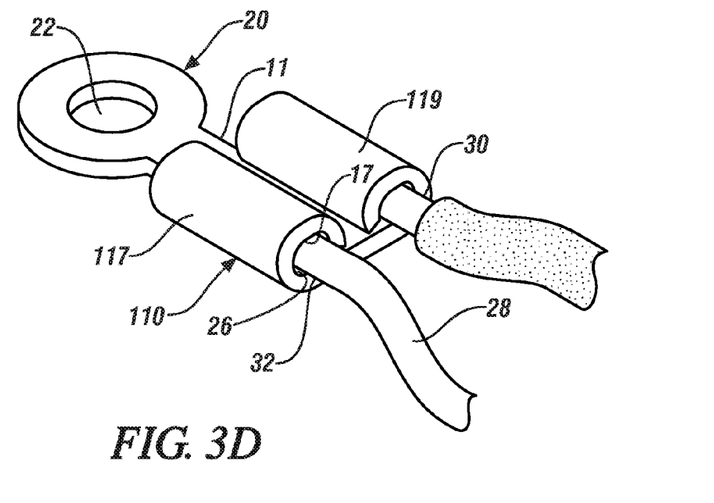
FIG. 3D shows the connector of FIG. 3A and a representative SMA element and electrical conductor element after crimping with a curved-faced crimp tool.

Examples of crimp connectors are shown at FIGS. 3A and 3B and examples of crimp joints in such a connector are illustrated at FIGS. 3C and 3D. FIG. 3A shows a stamped sheet metal connector 10 in which 'eye' segment 20 with opening 22 is connected by neck 11 to retainer portion 5 which includes two inclined 'wings' or walls 17, 19 terminating at edges 16, 18 and defining, on inner surface 12, an SMA element-receiving cavity portion 24 to receive the SMA element, not shown. Eye segment 20 is intended to engage with a complementary feature, for example a post, hook or threaded stud on a component of a mechanism. The illustration of eye segment 20 is intended to be representative and not limiting. Any suitable combination of complementary component-engaging features on the connector and connector-engaging features on the component may be selected without limitation.

FIG. 3B shows a connector 10' with similar eye feature 20 again attached through neck section 11 to a retainer portion 5', here a hollow cylindrical section 21, with external surface 12 and internal surface 14. This connector is derivative of the connector shown in FIG. 3A as it will be appreciated that, in a specific embodiment, walls 17, 19 (FIG. 3A) may be bent around in a cylindrical shape until edge 16 of wall 17 contacts edge 18 of wall 19. In this connector an SMA element, not shown, may be received within cavity 124 of the hollow cylinder.

In both of FIGS. 3A and 3B the attachment portion, here eye segment 20 and retainer portion 5 are aligned so that eye segment 20 lies on the longitudinal axis of SMA element 28. Such an arrangement is common, but alternate arrangements are possible. For example retainer portion 5 may be arranged so that neck 11 is oriented at some angle, say 90°, to the longitudinal axis of SMA element 28 so that eye segment 20 is laterally offset to the SMA element axis.

FIG. 3C shows the crimped connector 110' connector (corresponding to connector 10' of FIG. 3B) and a segment of SMA element 28 after crimping using a crimping tool with flat-faced anvils. Cylinder 21 has been collapsed and brought into contact with SMA element 28 so that some portion of the circumference of element 28 frictionally engages surface 112 of body 121. However, the use of flat-face anvils has also resulted in the formation of voids or openings 26 where further collapse of cylinder 21 is prevented by the resistance offered by element 28.

FIG. 3D shows a more complex joint formed by crimping connector 10 of FIG. 3A using a crimping tool with curved anvils. In FIG. 3D each of wings 17, 19 (FIG. 3A) has been individually rolled and collapsed around an individual element to form crimped sections 117, 119. In this configuration element 28 is an SMA element as in FIG. 3C, but insulated element 30 may be an electrical element intended for provision of electric current to crimped connector 110 for redistribution to SMA element 28. Although the geometry of the crimped opening 32 more closely conforms to the generally cylindrical external geometry of SMA element 28, voids 26 develop around the opening resulting in less-than-complete frictional engagement between connector surface 17 and the generally-cylindrical exterior surface of element 28. It will be appreciated that similar curved-surface crimp anvils may be used to shape walls 17, 19 (FIG. 3A) into a single generally-cylindrical opening capable of enclosing both electrical supply element 30 and SMA element 28. However such a geometry will promote more extensive voids 26 than the double-cylindrical geometry shown.

In each of FIGS. 3A-D, the geometry of the crimped joint section when viewed along the length of the connector, that is parallel to axis 100 as shown at FIG. 3D, is generally planar and the retaining force applied by the connector to the element results from the pressure applied by the collapsed element-receiving cavity.

Figure 4:
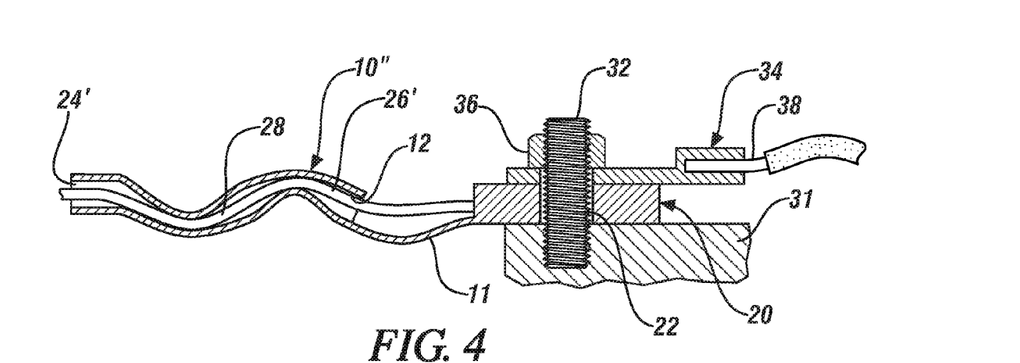
FIG. 4 is a longitudinal section through a second embodiment of a crimped connector similar to those shown in FIGS. 1C-D, particularly illustrating an embodiment of a connector with a element retaining portion with a sinuous geometry. The SMA element only partially conforms to the element retaining portion geometry so that in some sections element-connector contact does not occur and voids form.

In FIG. 4, a cross-sectional view parallel to axis 100 is shown of an alternate embodiment, connector 10", in which the element-receiving cavity 24', when crimped, adopts a wave-like, contoured geometry in the longitudinal direction, here shown, without limitation, as approximately sinusoidal. With this geometry, the inner surface 12, of the element-receiving cavity portion, contacts the exterior surface of SMA element 28 at the peaks and valleys of the contours but leaves voids or gaps 26' between these surfaces in the intermediate portions. In addition SMA element 28 is forced to adopt a sinuous or tortuous geometry resembling that of the crimped, element-receiving cavity portion of the connector. In response to any longitudinally-applied force SMA element will be forced to repeatedly bend and unbend if any relative slippage between inner surface 12 and the surface of element 28 occurs. This repeated bending will contribute to resisting slippage and add to the restraint resulting from purely frictional interaction. It will be appreciated that although multiple peaks and valleys are shown, even a single peak or valley will be effective in restraining longitudinal slippage of the SMA wire and so the number and amplitude of the waves may be adjusted as required. Also the illustrated orientation of the wave-like features with respect to the component-engaging feature, here eye segment 20 is non-limiting.

Figure 5:
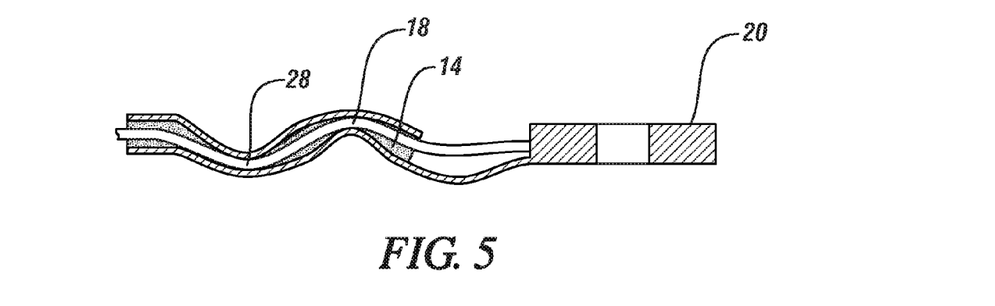
FIG. 5 is a longitudinal section through the second embodiment of a connector shown FIG. 4 further showing an included filler material disposed within the voids in the connector portion.

Additional restraint may be imparted to the element by filling the voids 26' with a suitable filler 14 as shown at FIG. 5. Addition of filler will increase the area of contact between the SMA element surface and the connector/filler and so will increase the frictional restraint against element pullout. Obviously such increased frictional restraint will obtain irrespective of the joint geometry and so similar enhancement of joint strength may be expected irrespective of the details of the joint geometry. For example, application of filler to void(s) 26 in FIG. 1C would also be expected to increase the SMA element pullout force even with this longitudinally planar crimp geometry.

FIG. 4 also illustrates an alternative electrical connection to the SMA element through the mating attachment member of eye section 20. Eye section 20 is shown with opening 22 placed over structure-mounted threaded post 32 embedded in some portion of structure 31. Eye section 20 is secured to post 32 by nut 36. Electrical connector 34 overlies SMA connector 10" and is also attached to post 32 and secured by nut 36. Thus if post 32 is electrically isolated from structure portion 31, current may be conveyed to post 32 by connecter 34 attached to current-carrying wire 38 and from there to SMA element 28 through SMA connector 10". Thus in embodiments, connectors may, as in FIG. 2 serve to establish a mechanical or a mechanical and electrical joint with SMA element 28 or, as in FIG. 3D and analogous forms, establish both mechanical and electrical joints with both SMA element and a suitable electrical conductor.

Yet further enhancement in joint strength may result if the filler may bond to both the connector and to the SMA to increase the interfacial forces generated between the filler and the connector and element. Shape memory behavior has been observed in a wide variety of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au-Zd, and Cu—Zn and phase transformation may occur over the temperature range of from between about −100° C. to about +150° C. or so, with specialized alloys transforming at even higher temperatures of up to about 300° C.

Thus the choice of filler material must be informed by the composition of the SMA and its operating temperature. For many applications a transformation temperature of about 70° C. or so is suitable and some variant of a nickel-titanium alloy composition, commonly called nitinol, may be chosen as an exemplary embodiment. Such an alloy may attain maximum in-service temperatures of up to about 140° C. over an extended lifetime of operation and so any filler should be selected to function at up to about this temperature. It will be appreciated that other alloys may require higher operating temperatures, possibly requiring that the choice of filler material be modified accordingly.

Suitable fillers may be low melting point metals or solders and polymers. The polymers may be thermoplastics or thermosets. Polymer fillers may incorporate additives for strength or to impart electrical conductivity or to develop a combination of these attributes. For example, short chopped carbon fibers or carbon nanotube additions to an electrically non-conductive polymer will be effective in promoting both increased strength and for imparting electrical conductivity. Generally spherical silver, nickel or copper powder may be more effective in increasing electrical conductivity without as great an increase in strength as provided by carbon fibers. Addition of electrically non-conductive fillers such as oxides, nitrides or carbides, for example aluminum oxide will increase strength but not electrical conductivity. Suitable thermoplastics will preferably have a glass transition temperature at least 30° C. higher than the maximum expected operating temperature of the SMA and more preferably a glass transition temperature 50° C. higher than the maximum operating temperature. Suitable thermosets may be selected for rapid cure and preferably for low-temperature cure. More preferably such thermosets may cure at room temperature, about 25° C. or so, with curing being promoted by oxygen, moisture or radiation, for example, ultraviolet light. Some epoxy formulations enable room temperature cure while offering good performance at temperatures representative of the anticipated SMA operating temperature range.

Similarly a low melting point solder should preferably have a melting point or a solidus temperature at least 50° C. greater than the maximum operating temperature and preferably even greater. Suitable alloys may include eutectic alloys 96.5 wt. % Sn-3.5 wt. % Ag (melting point 221° C.) and 80 wt. % Au-20 wt. % Sn (melting point 280° C.). For lower operating temperature SMA compositions a number of lower melting point solders, generally based on binary, ternary and quaternary compositions of lead, tin, bismuth and indium are available. For higher operating temperature SMA compositions higher melting point solders may be preferred. Many of these are lead-based alloys but two gold-based alloys may also be suitable; 88 wt. % Au-12 wt. % Ge, a eutectic composition, with a melting point of 356° C. and 82 wt. % Au-18 wt. % In with a melting range of 451-485° C.

For good bonding, it may be preferred to treat the surface of the SMA element and/or the surface of the connector. Such treatments may be particularly preferred for the nickel-titanium SMA alloy compositions since these alloys are prone to develop a heavy oxide coating, largely of $TiO_2$, which may be an impediment to the development of a strong SMA-filler bond. For polymer fillers, surface treatments such as abrading, shot peening or the like which remove the heavy oxide and create a roughened surface may be effective in improving bond strength as may treatment with silane coupling agents. For solder fillers, removal of the oxide is generally the most effective treatment coupled with the use of an acid based flux. The oxide may be removed by abrasion or by etching in a strong acid mixture. Alternatively the SMA surface may be plated, for example with nickel, to create a more solderable surface.

The connector surface may also generally be modified by plating or some other metal deposition process to lay down a metal coating which is compatible with the chosen filler, if necessary. Typical coatings may include tin nickel and chromium and these are generally wettable by solder. Again, for polymer fillers, a silane coupling agent may be employed to enhance bonding of the polymer to the connector surface.

Figure 6:
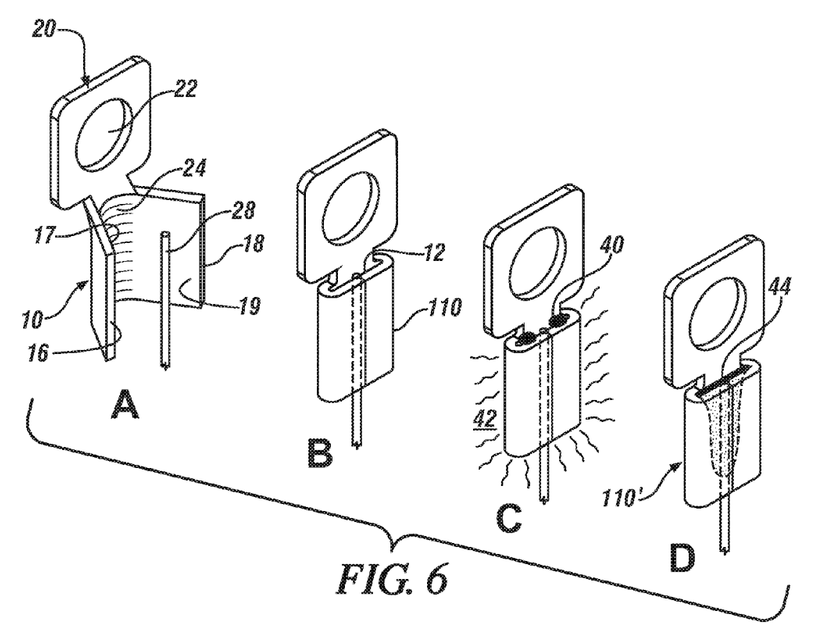
FIG. 6 shows an assembly process, illustrating the introduction of heated, flowable filler material within the voids formed by the assembly shown at FIG. 3A.

FIGS. 6A-D and 7A-B illustrate methods of applying or introducing these gap-filling or void-filling fillers into the connector so that they may contribute to increase the SMA element to connector joint strength. FIG. 6A-D shows a manufacturing sequence appropriate to a solder filler. At FIG. 6A a 'walled' connector (as in FIG. 3A) is shown and positioned for insertion of SMA element 28 into element-receiving cavity 24. In FIG. 6B, as in FIG. 3C, connector 10 has been crimped, using a flat-anvil crimp tool, to mechanically secure element 28 to crimped section 110 while leaving gaps or voids 12 around the element. In FIG. 6C, solder, here shown without limitation as individually-placed solder balls 40, has been positioned close to voids 12 (FIG. 6B). On raising the temperature of the connector by application of heat 42, the solder melt and, the molten solder is drawn, by capillary action, into voids 12 where it wets, and preferably bonds to, element 28 and interior surfaces 17, 19 of element-receiving cavity section 24 (FIG. 6A).

In principle such a process, application of a filler, as a fluid, to voids 12 and reliance on capillary action to transport the filler into the recesses of the connector is applicable to polymer fillers also. However the higher minimum viscosity (about 1000 mPa·s or so) of many polymers, both thermoset and thermoplastics, versus solder (the viscosity of molten tin is less than about 2 mPa·s) makes this process less suitable for charging the connector with polymer fillers.

Figure 7:
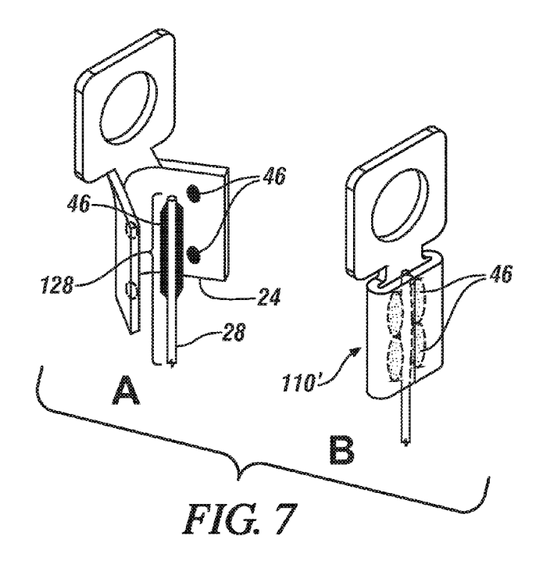
FIG. 7 shows an assembly process illustrating the introduction of a solid filler material within the voids formed by the assembly shown at FIG. 3A.

A second process, generally suitable for all fillers is shown at FIGS. 7A-B. In this embodiment a filler material, generically identified as 46, is pre-applied to either element 28 to form composite element 128, or to element-receiving cavity 24. Such an approach might, for example, charging the element or connecter with filler, for example by dipping the element end into molten solder or a liquid thermoplastic or a long pot life pre-mixed thermoset composition. After charging the element or connector, it may be retained, as a solid or liquid, until the joint is made. Alternatively (not shown), it may be preferred to apply filler material to both the connector and the element. For example, for a rapid set thermoset filler with a short pot life, it may be preferred to dip the element in resin and apply hardener to the cavity, or vice-versa, relying on the flow and intermingling resulting from crimping to appropriately mix these polymer precursor components.

In the case of thermoplastics and solder, either element 28, where the filler is applied to the connector, or element 128, where the filler is applied to element 28, is inserted into element-receiving cavity 24 and the connector crimped. If the solder or thermoplastic is flowable at ambient or near-ambient temperatures, say 20-35° C. or so, such crimping action may serve to flow and distribute filler 46 through the crimped portion 110'. Flow may also be promoted by application of heat sufficient to render solid solder or solid thermoplastic material flowable so that it may more readily flow and spread filler 46 along the length of crimped element-receiving portion 110'. Optionally this, crimped portion 110' may be crimped for a second time while the filler is flowable to better foster good distribution of filler 46.

In all the examples shown, the structural element has been shown as a single SMA element. The maximum force which may be obtained from such an element increases with increase in element diameter. But, in some higher force applications, it may be preferred to use a plurality of smaller diameter SMA elements rather than an individual larger diameter SMA element. This plurality of elements may be separate, a loose grouping of individual elements, or interleaved in a particular pattern, for example woven to form a braid, or grouped and twisted into a rope or cable. It will be appreciated that provided the filler is selected to bond and adhere to such a plurality of elements and provided the described practices for distributing the filler throughout the joint area are followed, that the practices of the invention are equally applicable to these multi-element geometries.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

The invention claimed is:

1. A method of connecting an end portion of a linear shape memory alloy (SMA) element to a mechanical device, the method comprising:

connecting the SMA element to a moveable component of the mechanical device where the SMA element, when heated to a phase-changing temperature by passage of electric current along its length, repeatedly generates and applies a predetermined tensile force to the moveable component to displace the moveable component from an initial position and thereby operate the mechanical device, the moveable component incorporating a feature adapted and arranged to mechanically engage a complementary feature on an electrically-conductive unitary, load-transmitting connecter attached to the end portion of the SMA element, the method further comprising:

providing the electrically-conductive unitary, load-transmitting connector, the connector having a length and the feature complementary to the engageable feature on the moveable component adjoining a retaining feature for joining the end portion of the elongated linear SMA element to the load-transmitting connector, the retaining feature comprising a deformable elongated metal casing with opposing openings, the casing having an inner wall defining a cavity with a length, the cavity being sized and adapted to receive the SMA element;

inserting the end portion of the SMA element through one of the casing openings and into the cavity in a manner which does not prejudice the function of the complementary attachment feature, the length of the inserted end portion being at least equal to the length of the cavity, but less than the length of the connector, the length of the cavity being selected to enable a joint between the end portion of the SMA element and the retaining feature of the load-transmitting connector, the joint being adapted to prevent relative motion between the load-transmitting connector and the SMA element under application of the SMA-generated predetermined tensile force during repeated operation of the mechanism;

crimping the metal casing by application of an inwardly-directed compressive force to collapse the casing inwardly to bring a portion of the casing inner wall surface into compressive engagement with a surface of the inserted end portion of the SMA element;

inserting a filler into the casing to bond the casing to the SMA element end portion to further inhibit relative motion between the load-transmitting connector and the SMA element under application of the SMA-generated predetermined tensile force; and attaching the load-transmitting connector to the incorporated feature of the moveable component of the mechanical device.

2. The method of claim 1, further comprising deforming the elongated casing to develop one or more wave-like shapes along the length of the deformed casing.

3. The method of claim 1, further comprising inserting the filler into the crimped casing as a flowable liquid by capillary action.

4. The method of claim 1, further comprising inserting the filler by depositing a filler material on one or both of the inner wall of the casing or the SMA wire prior to crimping the casing.

5. The method of claim 1, further comprising heating the load-transmitting connector after crimping the casing to elevate its temperature to enhance the flowability of the filler.

6. The method of claim 1, further comprising treating the surface of the SMA element end to prepare the SMA surface to enhance the bonding of the SMA to the filler prior to inserting the end into the receptacle.

7. The method of claim 1, further comprising attaching an electrically-conductive wire to the load-transmitting connector to enable Joule heating of the SMA wire.

8. The method of claim 1, further comprising, prior to performing the steps of: crimping the metal casing to bring a portion of the casing inner wall surface into compressive engagement with a surface of the inserted length of SMA element; inserting a filler into the casing to bond the casing to the SMA element; and attaching the connector to the moveable component:

inserting an end portion of one or more additional SMA elements through one of the openings and into the cavity of the element-retaining portion of the load-ransmitting connector, the length of the inserted end(s) being at least equal to the length of the cavity.

9. The method of claim 1 in which the filler is one of the group consisting of a thermoplastic polymer, a thermoset polymer and a metal alloy.

10. The method of claim 1 in which the polymer filler comprises one or more additives consisting of one or more of particles or fibers to increase either or both of the electrical conductivity or strength of the polymer filler.

11. The method of claim 5, further comprising again crimping the retaining feature while the load-transmitting connector is at the elevated temperature to enhance the distribution of filler.

12. The method of claim 6 in which the filler bonding-enhancing surface preparation treatment is one or more of chemical and electrochemical treatments, energy beam treatments, plasma treatments and mechanical treatments.

13. The method of claim 12 in which the filler bonding-enhancing chemical surface preparation treatment is application of a silane.

14. The method of claim 12 in which the filler bonding-enhancing electrochemical surface preparation treatment is metal plating.

15. The method of claim 12 in which the filler bonding-enhancing mechanical surface preparation treatment is abrasion.

16. A method of connecting of a linear shape memory alloy (SMA) element to an electrically-conductive, unitary, load-transmitting connector, the method comprising securing an end portion of the linear SMA element to a retaining feature in the electrically-conductive, unitary, load-transmitting connector, the SMA element being arranged and adapted to contract and generate a predetermined tensile force when heated to a phase-changing temperature by passage of electric current along its length, the connector having an engageable feature complementary to a feature on a moveable component of a mechanical device so that, when connected to the moveable component, the phase-changing characteristic of the SMA element may displace the moveable component from an initial position and thereby operate the mechanical device, the method further comprising:

provide the electrically-conductive, unitary, load-transmitting connector with a length and the engageable feature, the engageable feature being adapted to transmit the predetermined tensile force generated by the SMA element, the connector abutting the engageable feature, the connector retaining feature comprising a deformable elongated metal casing with opposing openings, the casing having an inner wall defining a cavity with a length, the cavity being sized and adapted to receive the SMA element;

inserting an end portion of the SMA element through one of the casing openings and into the element-receiving cavity, the length of the inserted end portion being at least equal to the length of the element-receiving cavity but less than the length of the connector, the length of the element-receiving cavity being selected to enable a joint between the SMA element and the retaining feature of the load-transmitting connector, the joint being adapted to prevent relative motion between the load-transmitting connector and the SMA element under application of the SMA-generated predetermined tensile force during heating of the SMA element;

crimping the metal casing by application of an inwardly-directed compressive force to collapse the casing inwardly to bring a portion of the inner wall of the element-receiving cavity into compressive engagement with a surface of the inserted length of SMA element end portion; and, inserting a filler into the casing to bond the interior wall of the casing to the end portion of the SMA element to further inhibit relative motion between the load-transmitting connector and the SMA element under application of the SMA-generated predetermined tensile force.

17. The method of claim 16, further comprising deforming the elongated casing to develop one or more wave-like shapes along the length of the deformed casing.

18. The method of claim 16, further comprising inserting the filler into the crimped casing as a flowable liquid by capillary action.

19. The method of claim 16, further comprising inserting the filler by depositing a filler material on one or both of the inner wall of the casing or the SMA wire prior to crimping the casing.

20. The method of claim 16, further comprising heating the load-transmitting connector after crimping the casing to elevate its temperature to enhance the flowability of the filler.

* * * * *